United States Patent
Wu

(10) Patent No.: US 7,016,997 B2
(45) Date of Patent: Mar. 21, 2006

(54) METHOD FOR DETERMINING AN INTERRUPTION SOURCE

(75) Inventor: Chun-Yi Wu, Shindian (TW)

(73) Assignee: Via Technologies, Inc., Taipei (TW)

( * ) Notice: Subject to any disclaimer, the term of this patent is extended or adjusted under 35 U.S.C. 154(b) by 406 days.

(21) Appl. No.: 10/175,038

(22) Filed: Jun. 20, 2002

(65) Prior Publication Data
US 2003/0041200 A1 Feb. 27, 2003

(30) Foreign Application Priority Data
Aug. 23, 2001 (TW) .............................. 90120769 A

(51) Int. Cl.
*G06F 13/24* (2006.01)
*G01R 31/00* (2006.01)

(52) U.S. Cl. ...................................... 710/260; 702/119
(58) Field of Classification Search ................ 710/260, 710/266, 268; 714/735–737, 742; 703/23–27; 702/119
See application file for complete search history.

(56) References Cited
U.S. PATENT DOCUMENTS

| 5,644,705 A * | 7/1997 | Stanley ......................... 714/42 |
| 6,076,180 A * | 6/2000 | Meyer ......................... 714/742 |
| 6,571,204 B1 * | 5/2003 | Meyer ......................... 703/22 |
| 6,571,360 B1 * | 5/2003 | Drogichen et al. ........... 714/44 |

* cited by examiner

*Primary Examiner*—Khanh Dang
(74) *Attorney, Agent, or Firm*—Rabin & Berdo, PC

(57) ABSTRACT

A testing method to discern an original source with respect to the interruption, suitable for use in a computer system is provided. The computer system includes an integrated drive electronics (IDE) bus and a peripheral component interconnect (PCI) bus. The IDE bus is connected to a testing IDE device and the standard IDE device. The PCI bus includes a plurality of input/output (I/O) ports. First, one of the I/O ports is set up with a testing flag and a command is issued to the testing IDE device. After then, the interruption sent from the testing IDE device or the standard IDE device is received. Next, it is checked whether or not the testing flag is set. If it is, then it can be determined that the interruption is coming from the testing IDE device. The present invention can discern the interruption, which is coming from which one of the correct source, under the mode or the real mode, so as to be helpful for testing.

11 Claims, 2 Drawing Sheets

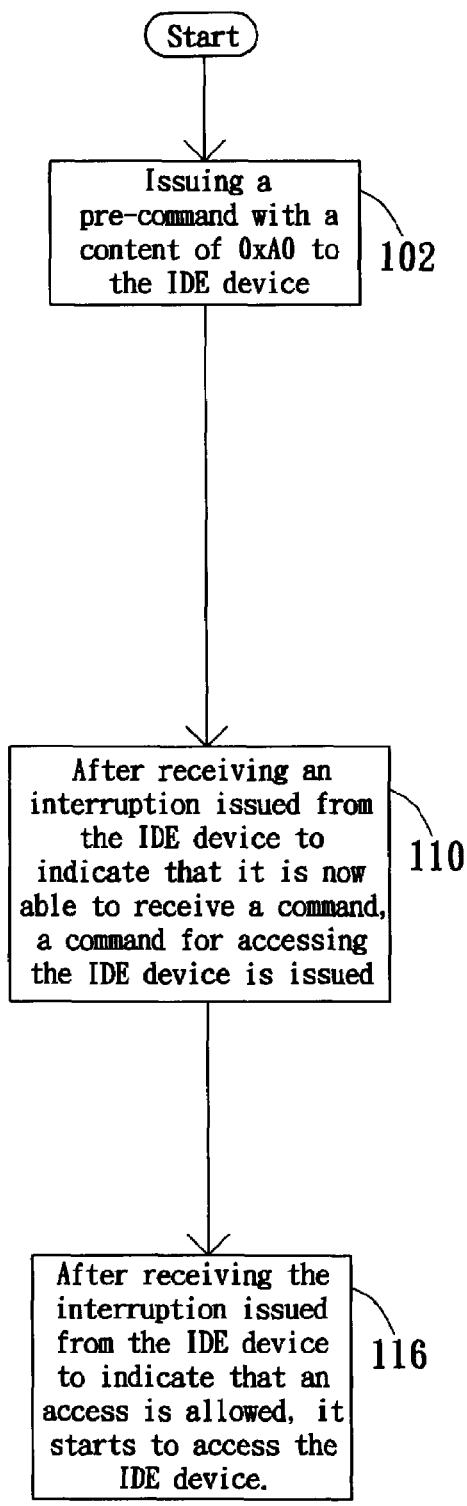
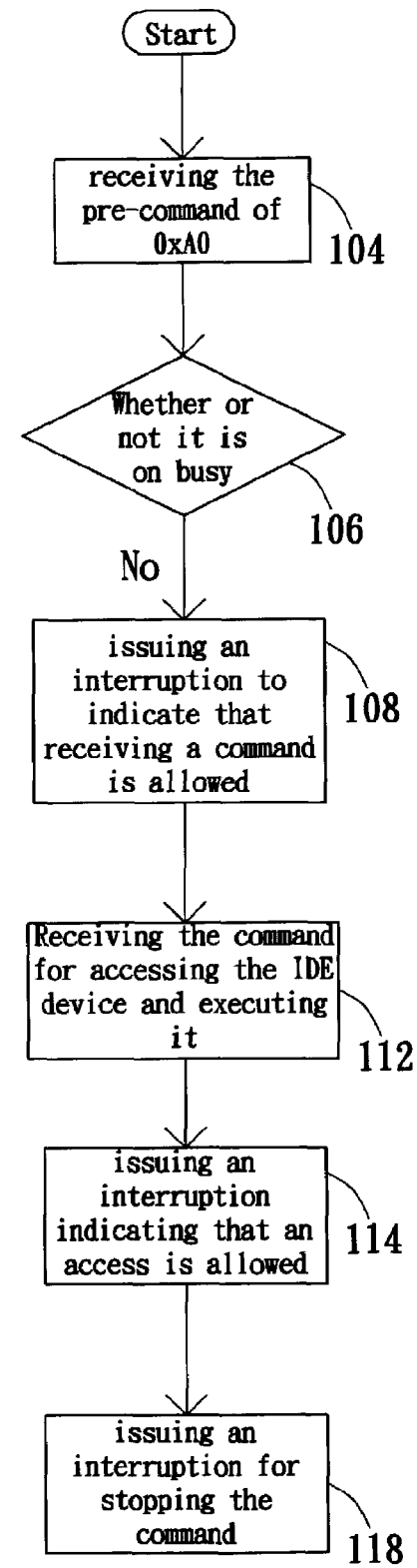
FIG. 1A
(PRIOR ART)
FIG. 1B
(PRIOR ART)

METHOD FOR DETERMINING AN INTERRUPTION SOURCE

This application incorporates by reference of Taiwan application Serial No. 090120769, filed Aug. 23, 2001.

BACKGROUND OF THE INVENTION

1. Field of the Invention

This invention relates to a method for determining an interruption source, and more particularly, the invention relates to a test method for determining an interruption source, which is issued by an integrated drive electronics device.

2. Description of Related Art

The integrated drive electronics (IDE) device is nowadays commonly used as a peripheral device of a computer system, such as the hard disk drive or the CD/DVD-ROM optical disc drive. In the personal computer system, each of the IDE buses can be used to connect two IDE devices, which are respectively positioned at a primary bus of the IDE bus and a secondary bus of the IDE bus. Since the command set being used is different, The IDE devices can also be divided into types of the ATA device and the ATAPI device. The ATA device is for example a hard disk device, and the ATAPI device for example is CD/DVD-ROM optical disc drive, optical rewriteable disc drive, or ZIP disk drive. The command set that is used to access the ATA device, is the ATA command, and the command set that is used to access the ATAPI device, is the ATAPI command. As shown in FIG. 1A, it is a drawing, schematically illustrating a command flow diagram for proceeding the data access from the host to the IDE device. In FIG. 1A, the IDE device is a type of the ATAPI device, and the command set being used is the ATAPI command. Also referring to FIG. 1B at the same time, it is a drawing schematically illustrating an action flow diagram of the IDE device for responding to the commands made by the host. At the first, the host issues a pre-command to the IDE device. This pre-command is a content of 0xA0 in the ATAPI command, as shown in the step 102. As the IDE device receives this pre-command, as shown in the step 104, then it is checked to know whether or not the IDE device is busy, as shown in the step 106. If it is not busy, then an interruption is issued so as to inform the host, that the IDE device is ready to receive commands, as shown in the step 108. When the host receives the interruption from the IDE device, then the host issues an access command to the IDE device, as shown in the step 110. This access command is a packet command with a size of 12 bytes, and is used, for example, to read data from IDE device or to write data into the IDE device. When the IDE device receives the access command issued by the host, then the access command is executed, as shown in the step 112. For example, the data of the IDE device is read out and is stored in the buffer region. After that, an interruption, indicating the access being ready, is issued as shown in the step 114. When the host receives the interruption for access-ready, then the host starts to access the IDE device, as shown in the step 116. After the access is finished, the IDE device issues again an interruption for stopping the command, as shown in the step 118.

When the IDE device being developed, it needs a test program to perform a test on the IDE device. At this stage, this IDE device is called a testing IDE device. The test program includes a simulation program and a testing interruption service routine (ISR). All of the interruptions issued by the IDE device are intercepted by the testing ISR. The simulation program issues a command to the testing IDE device, which in turn responds to an interruption. The testing ISR intercepts this interruption for performing the testing process and then returns again to the simulation program. However, if the testing IDE device and another standard IDE device are respectively connected to the same IDE bus at the master position and the slave position, then the testing ISR can not discern which IDE device issued the received interruption, and therefore it cannot be known whether or not a testing process is necessary. The solution in the conventional method is, for example, that before the simulation program is to issue the command to the testing IDE device, a flag is asserted beforehand. Also, after the testing ISR receives the interruption, it first goes to check this flag to see whether or not the flag has been asserted. If it is, the interruption being received is issued from the testing IDE device. The test program is operated under the Microsoft disk operation system (MS-DOS) in real mode. In the real mode, it can only access a memory device with a size of 640K bytes. If a larger memory device needs to be accessed, then it should enter the protected mode. The memory device cannot be shared in the protected mode and in the real mode.

However, the testing IDE device could be issuing the interruption under the real mode or the protected mode, but the simulation program does execute and set up the flag under the protected mode. If the testing IDE device issues the interruption under the real mode, the testing ISR will not be able to detect flag set by the simulation program, thereby it cannot be judged whether or not the interruption is issued by the testing IDE device.

SUMMARY OF THE INVENTION

It is therefore an objective of the present invention to provide a testing method for discerning which one is the original source with respect to the interruption under protected mode or the real mode.

In accordance with the foregoing and other objectives of the present invention, the invention provides a testing method to discern an original source with respect to the interruption, suitable for use in a computer system. The computer system includes an integrated drive electronics (IDE) bus and a peripheral component interconnect (PCI) bus. The IDE bus is connected to a testing IDE device and the standard IDE device. The PCI bus includes a plurality of input/output (I/O) ports. First, one of the I/O ports is set with a testing flag and a command is issued to the testing IDE device. After then, the interruption sent from the testing IDE device or the standard IDE device is received. Next, it is checked whether or not the testing flag is set. If it is, then it can be determined that the interruption is coming from the testing IDE device.

BRIEF DESCRIPTION OF DRAWINGS

The invention can be more fully understood by reading the following detailed description of the preferred embodiments, with reference made to the accompanying drawings, wherein:

FIG. 1A is a diagram drawing, schematically illustrating a command flow diagram for proceeding the data access from the host to the IDE device;

FIG. 1B is a diagram drawing, schematically illustrating an action flow diagram of the IDE device for responding to the commands made by the host.

DETAILED DESCRIPTION OF PREFERRED EMBODIMENTS

Figure 2:
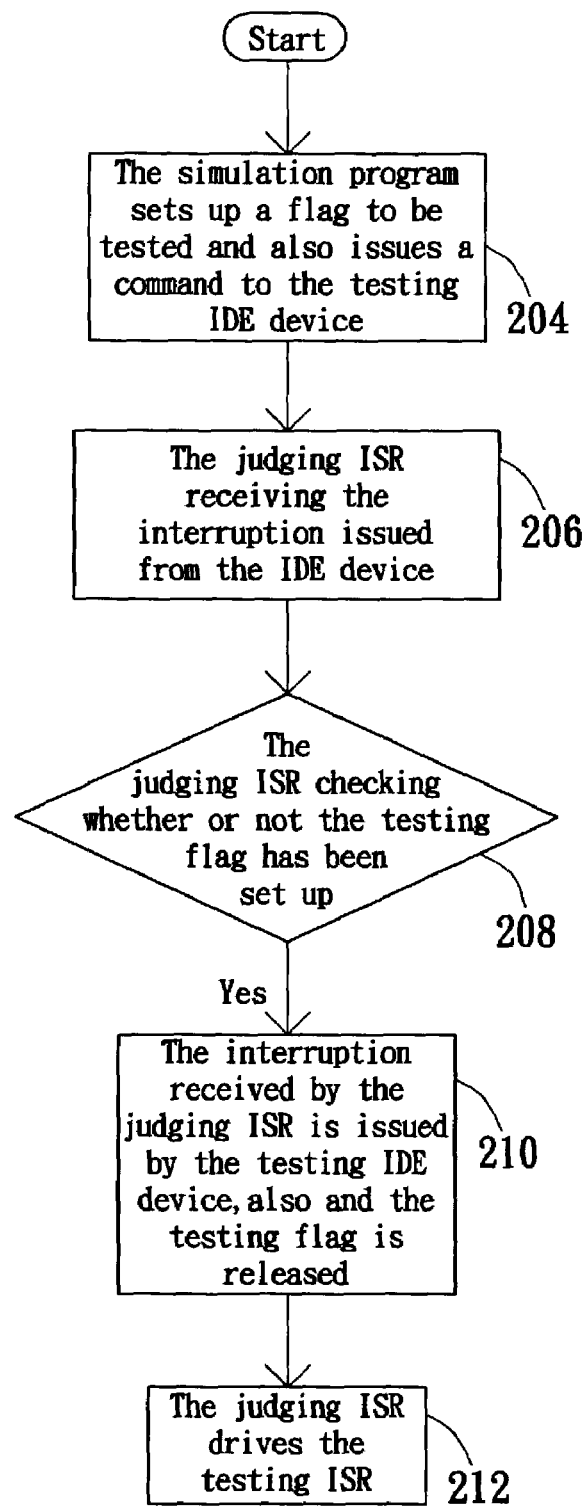
FIG. 2 is a diagram drawing, schematically illustrating a flow diagram of a testing method to determine the original source with respect to the interruption, according to a preferred embodiment of the present invention.

FIG. 2 is a diagram drawing, schematically illustrating a flow diagram of a testing method to determine the original source with respect to the interruption, according to a preferred embodiment of the present invention. This method is applied a computer system, which includes an integrated drive electronics (IDE) bus and a peripheral component interconnect (PCI) bus. The IDE bus is connected to a testing IDE device and a standard IDE device. The PCI bus includes a plurality of input/output (I/O) ports. When an IDE device has been developed at the final stage, it needs a test program being performed to test this IDE device, hereinafter called a testing IDE device. The test program includes a simulation program, a testing interruption service routine (ISR), and a judging interruption service routine. At the initial stage, it needs first to redirect the interruption, which is issued by the IDE devices, to the judging ISR. This also means that the interruptions issued by all of the IDE devices will be received by the judging ISR. First, the simulation program sets up a testing flag at one of the I/O ports and also issues a command to the testing IDE device, as shown in the step 204. Next, the judging ISR receives the interruption issued by the IDE device, as shown in the step 206. Then, the judging ISR checks whether or not the testing flag has been set up, as shown in the step 208. If it is, then it means that the received interruption is issued by the testing IDE device, and then the testing flag is released as shown in the step 210. Then, step 212 is performed. In the step 212, the judging ISR drives the testing ISR to execute the subsequent testing procedure.

The test program is operated under the Microsoft disk operation system (MS-DOS). In the real mode, it can only access a memory device with a size of 640K bytes. If a larger memory device must be accessed, then it should enter the protected mode. The memory devices cannot be shared in the protected mode and in the real mode. However, the testing IDE device could be issuing the interruption under the real mod or the protected mode, but the simulation program does execute and set up the flag under the protected mode. The I/O port on the PCI bus can be shared for reading and writing under the protected mode and the real mode. Therefore, the present invention sets up the testing flag on the I/O port of the PCI bus, so as to assure that all of the interruptions issued by the testing IDE device under the real mode or the protected mode can be received so as to determine the original source with respect to the interruptions, and can be helpful for performing test.

In summary of the present invention, the method disclosed in the foregoing preferred embodiment of the present invention for judging the original sources responsible for the interruptions can judge the original source with respect to the received interruption under the protected mode or the real mode.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for testing an integrated drive electronics (IDE) device in a computer system, wherein the computer system includes a peripheral component interconnect (PCI) bus and an IDE bus coupled to the PCI bus, a plurality of IDE devices are connected to the IDE bus, and the PCI bus includes a plurality of input/output (I/O) ports, the method is operable under one of a real mode and a protected mode, and memory sharing can be done only in one of the real mode and the protected mode, the method comprising the steps of:

when a selected one of the IDE devices is to be tested, setting up a testing flag at one of the I/O ports of the PCI bus and sending a command to the selected one of the IDE devices;

in response to a specific interrupt signal issued by one of the IDE devices after the command is sent, determining whether to perform IDE device testing with respect to the specific interrupt signal by determining whether the testing flag is set up at the I/O port of the PCI bus; and if the testing flag is set up at the I/O port of the PCI bus, performing IDE device testing on the one of the IDE devices with respect to the specific interrupt signal, wherein the determination that the testing flag is set up at the I/O port of the PCI bus indicates that the one of the IDE devices with respect to the specific interrupt signal is the selected one of the IDE devices;

wherein the testing flag is set up at the I/O port of the PCI bus so that the determination as to whether to perform IDE device testing with respect to the specific interrupt can be made regardless of whether the one of the IDE devices issues the specific interrupt signal under the real or protected mode.

2. The method according to claim 1, wherein the I/O port of the PCI bus that the testing flag is set up at is port number 0x81.

3. The method according to claim 1, wherein the I/O port of the PCI bus that the testing flag is set up at is port number 0x80.

4. The method according to claim 1, wherein the IDE device is a CD/DVD-ROM optical disc drive.

5. The method according to claim 1, wherein the testing flag is set up at the I/O port of the PCI bus under protected mode and the specific interrupt signal is issued by the one of the IDE devices under the protected mode.

6. The method according to claim 1, wherein the testing flag is set up at the I/O port of the PCI bus under the protected mode and the specific interrupt signal is issued by the one of the IDE devices under real mode.

7. A method for testing an integrated drive electronics (IDE) device in a computer system, wherein the computer system includes a peripheral component interconnect (PCI) bus and an IDE bus coupled to the PCI bus, a plurality of IDE devices are connected to the IDE bus, and the PCI bus includes a plurality of input/output (I/O) ports, the method is operable under one of a real mode and a protected mode and memory sharing can be done only in one of the real mode and the protected mode, the method comprising the steps of:

providing a testing interrupt service routine for IDE device testing and a judging interrupt service routine for determining whether to perform IDE device testing; and enabling the judging interrupt service routine to respond to any interrupt signal issued by any of the IDE devices;

when a selected one of the IDE devices is to be tested, setting up a testing flag at one of the I/O ports of the PCI bus and sending a command to the selected one of the IDE devices;

in response to a specific interrupt signal issued by one of the IDE devices after the command is sent, determining whether to perform IDE device testing with respect to the specific interrupt signal by determining whether the testing flag is set up at the I/O port of the PCI bus; and if the testing flag is set up at the I/O port of the PCI bus, performing IDE device testing on the one of the IDE devices with respect to the specific interrupt signal, wherein the determination that the testing flag is set up at the I/O port of the PCI bus indicates that the one of the IDE devices with respect to the specific interrupt signal is the selected one of the IDE devices;

wherein the testing flag is set up at the I/O port of the PCI bus so that the determination as to whether to perform IDE device testing with respect to the specific interrupt can be made regardless of whether the one of the IDE devices issues the specific interrupt signal under the real or protected mode.

8. The method according to claim 7, wherein the step of performing IDE device testing comprises:

if the testing flag is set up at the I/O port of the PCI bus, activating the testing interrupt service routine by the judging interrupt service routine; and performing IDE device testing on the one of the IDE devices with respect to the specific interrupt signal by the testing interrupt service routine.

9. The method according to claim 8, wherein the step of setting up a testing flag at one of the I/O ports of the PCI bus is performed under the protected mode and the specific interrupt signal is issued by the one of the IDE devices under the real mode.

10. The method according to claim 7, wherein the step of setting up a testing flag at one of the I/O ports of the PCI bus is performed by a simulation program.

11. The method according to claim 10, wherein the simulation program sets up the testing flag at the I/O port of the PCI bus under protected mode and the specific interrupt signal is issued by the one of the IDE devices under real mode.

* * * * *